US010613696B2

(12) United States Patent
Sonoda et al.

(10) Patent No.: US 10,613,696 B2
(45) Date of Patent: Apr. 7, 2020

(54) INPUT DEVICE FOR TOUCH OPERATION

(71) Applicant: Panasonic Intellectual Property Management Co., Ltd., Osaka (JP)

(72) Inventors: Sho Sonoda, Osaka (JP); Takuma Besshi, Osaka (JP); Shogo Maenaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 28 days.

(21) Appl. No.: 16/122,946

(22) Filed: Sep. 6, 2018

(65) Prior Publication Data

US 2019/0079608 A1 Mar. 14, 2019

(30) Foreign Application Priority Data

Sep. 13, 2017 (JP) ................................ 2017-175683

(51) Int. Cl.
*G06F 3/044* (2006.01)
*G06F 3/02* (2006.01)
*G06F 3/0362* (2013.01)
*G06F 3/041* (2006.01)
*G06F 3/0354* (2013.01)

(52) U.S. Cl.
CPC ............ *G06F 3/044* (2013.01); *G06F 3/0202* (2013.01); *G06F 3/0362* (2013.01); *G06F 3/03547* (2013.01); *G06F 3/0416* (2013.01)

(58) Field of Classification Search
CPC .. G06F 3/0362; G06F 3/03547; G06F 3/0416; G06F 3/044; G06F 3/0202
See application file for complete search history.

(56) References Cited

U.S. PATENT DOCUMENTS

2003/0008679 A1* 1/2003 Iwata ............... G06F 3/147
455/556.1
2013/0241579 A1 9/2013 Takahashi
2014/0300571 A1 10/2014 Tomizu et al.

FOREIGN PATENT DOCUMENTS

| JP | 2012-221905 A | 11/2012 |
| JP | 2013-191058 | 9/2013 |
| JP | 2016-051501 A | 4/2016 |
| WO | 2013/061499 | 5/2013 |

OTHER PUBLICATIONS

Notice of Reasons for Refusal in Japan dated Nov. 26, 2019 for the related Japanese Patent Application No. 2017-175683.

* cited by examiner

*Primary Examiner* — Yaron Cohen
(74) *Attorney, Agent, or Firm* — Greenblum & Bernstein, P.L.C.

(57) ABSTRACT

An operation unit of an input device has an operation body having a closed-end tubular shape and provided to be rotatable relative to a device body, and a sensor body provided on the device body in the operation body. The operation body enables a touch operation onto operation face S formed on at least a top face part, and enables a rotating operation that is different from the touch operation by rotating relative to the device body while holding its side face. The sensor body includes a detection face that is capable of detecting the touch operation of a detection target in contact with operation face S, and a periphery of the detection face and a periphery of a top face part of the operation body overlap each other in a vertical direction.

20 Claims, 7 Drawing Sheets

INPUT DEVICE FOR TOUCH OPERATION

CROSS-REFERENCE TO RELATED APPLICATIONS

This application claims the benefit of foreign priority of Japanese patent application No. 2017-175683, filed on Sep. 13, 2017, the contents all of which are incorporated herein by reference.

TECHNICAL FIELD

The present disclosure relates to an input device and in particular, an input device provided in vehicles such as automobiles.

BACKGROUND ART

A conventional input device for input to vehicle-mounted devices of automobiles is disclosed in, for example, PTL 1.

PTL 1 discloses an input device including: a rotational support member; a base member disposed on an upper side of the rotational support member to be unrotatable relative to the rotational support member; a capacitance sensor provided on an upper side of the base member; and an operation body that has a closed-end cylindrical shape and surrounds the capacitance sensor from above, the operation body being rotatably supported relative to the base member. The operation body enables a touch operation using a top face part as an operation face, as well as an input operation that is different from the touch operation by holding and rotating its side face part relative to the rotational support member. Further, a detection face formed on the surface of the capacitance sensor is smaller than the top face part of the operation body.

CITATION LIST

Patent Literature

PTL 1: Unexamined Japanese Patent Publication No. 2013-191058

SUMMARY OF THE INVENTION

An input device according to an exemplary embodiment of the present disclosure includes a device body and an operation unit. The operation unit has an operation body and a sensor body that are provided in a first direction of the device body. The operation body is movable relative to the device body in the first direction of the device body, and has a first face part and a second face part. A second direction is opposite to the first direction, and the first face part has a substantially flat face that is perpendicular to the first direction, and the second face part has a face extending from a periphery of the first face part in parallel to the second direction. The sensor body is provided on the device body within the operation body, the operation body enables a touch operation using an operation face formed on at least the first face part and enables an input operation that is different from the touch operation by moving relative to the device body while being held at the second face part, and the sensor body includes a substantially flat detection face that has a substantially flat shape and is capable of detecting the touch operation of a detection target in contact with the operation face. A portion of a periphery of the detection face and the periphery of the first face part of the operation body overlap each other in the first direction of the device body.

According to the present disclosure, since a portion of the periphery of the detection face of the sensor body and the periphery of the first face part of the operation body overlap each other in a protruding direction of the device body, the periphery of the first face part of the operation body is included in the touchable operation face. For this reason, the touch operation of the user at the periphery of the first face part of the operation body can be properly detected at the periphery of the detection face, which corresponds to the periphery of the first face part. Therefore, according to the present disclosure, the touch operation onto the operation body can be improved.

DESCRIPTION OF EMBODIMENTS

Prior to describing exemplary embodiments of the present disclosure, a problem of a conventional device is briefly described. In the input device described in PTL 1, a periphery of the detection face of the capacitance sensor is located closer to a radial inner side than a periphery of a top face part of the operation body is. That is, the detection face of the capacitance sensor does not extend to the vicinity of a side face part of the operation body. For this reason, disadvantageously, the capacitance sensor may not properly detect that a user touches the periphery of the top face part of the operation body.

The present disclosure is devised in consideration of the above-mentioned problem, and an object of the present disclosure is to improve the touch operation onto the operation body of the input device.

Exemplary embodiments of the present disclosure will be described in detail with reference to drawings. Descriptions of the following exemplary embodiments are fundamentally examples and are not intended to restrict the present disclosure, applications or usage of the present disclosure.

Figure 1:
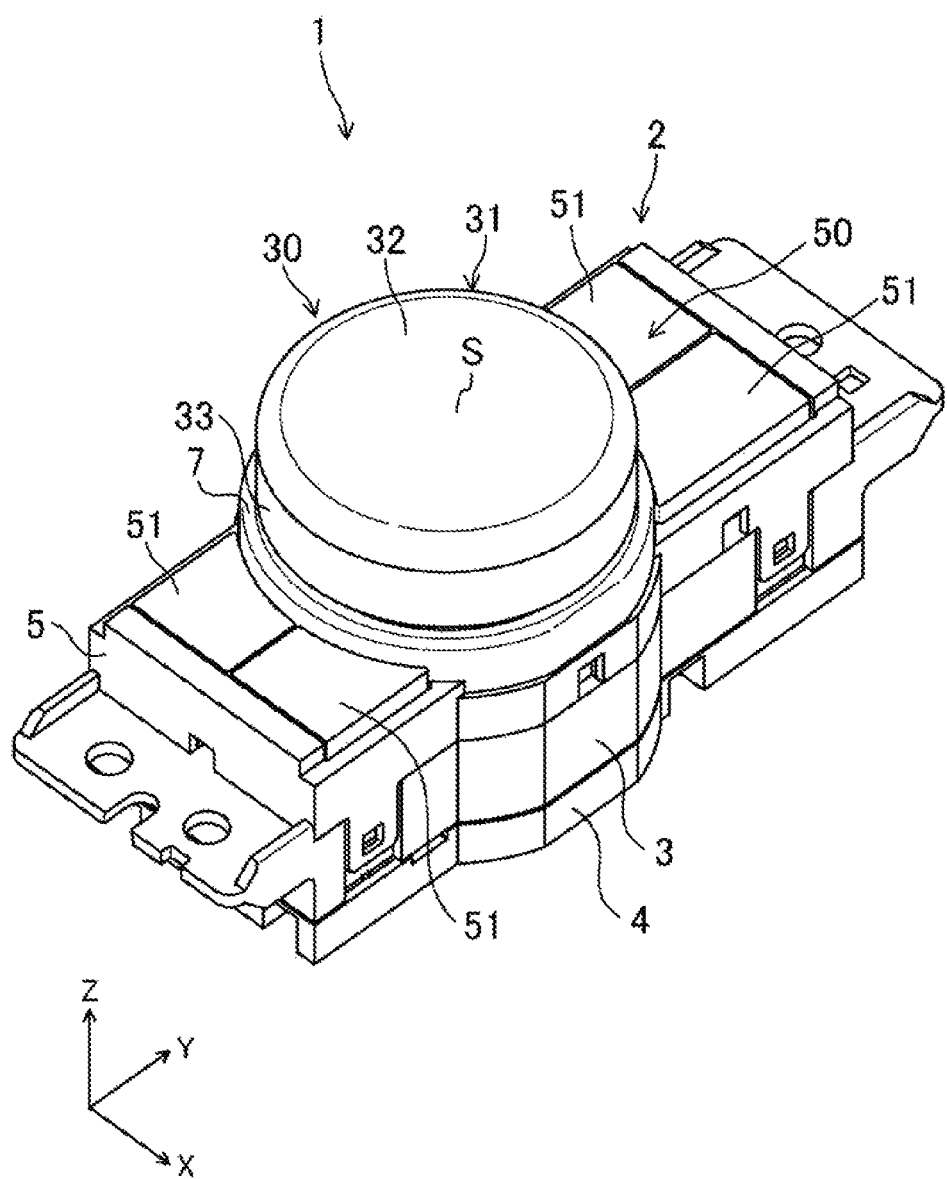
FIG. 1 is a perspective view illustrating an entire input device according to an exemplary embodiment of the present disclosure.

FIG. 1 illustrates entire input device 1 according to an exemplary embodiment of the present disclosure. Input device 1 serves to perform an input operation to a vehicle-mounted device of an automobile, and for example, is provided on a center console of an automobile. Examples of the vehicle-mounted device include a navigation system, audio equipment, and an air-conditioner in the automobile.

Input device 1 mainly includes device body 2, operation unit 30, and function switch 50. The respective members will be described below in detail.

Hereinafter, in the following description, a vertical positional relationship of input device 1 will be expressed by describing a side on which operation unit 30 is disposed with respect to device body 2 as an upper side (up), and an opposite side to the upper side as a lower side (down). In each figure, a direction from a left side toward a right side of input device 1 in FIG. 1 will be expressed as an X-axis direction, a direction from a near side toward a further side of input device 1 in FIG. 1 will be expressed as a Y-axis direction, and a direction from a lower side toward an upper side of input device 1 in FIG. 1 will be expressed as a Z-axis direction. Such a positional relationship is not relevant to an actual direction when input device 1 is installed in the automobile.

(Device body)

Figure 2:
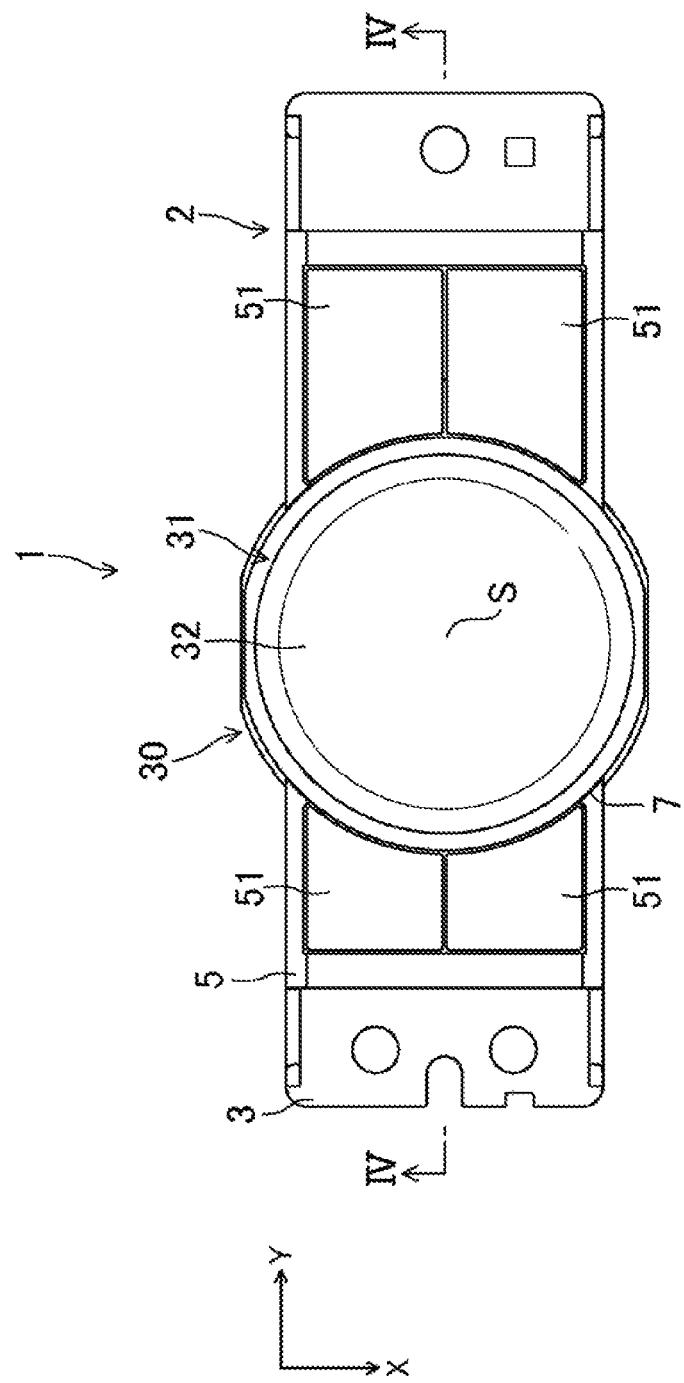
FIG. 2 is a plan view illustrating the input device according to the exemplary embodiment of the present disclosure.
Figure 3:
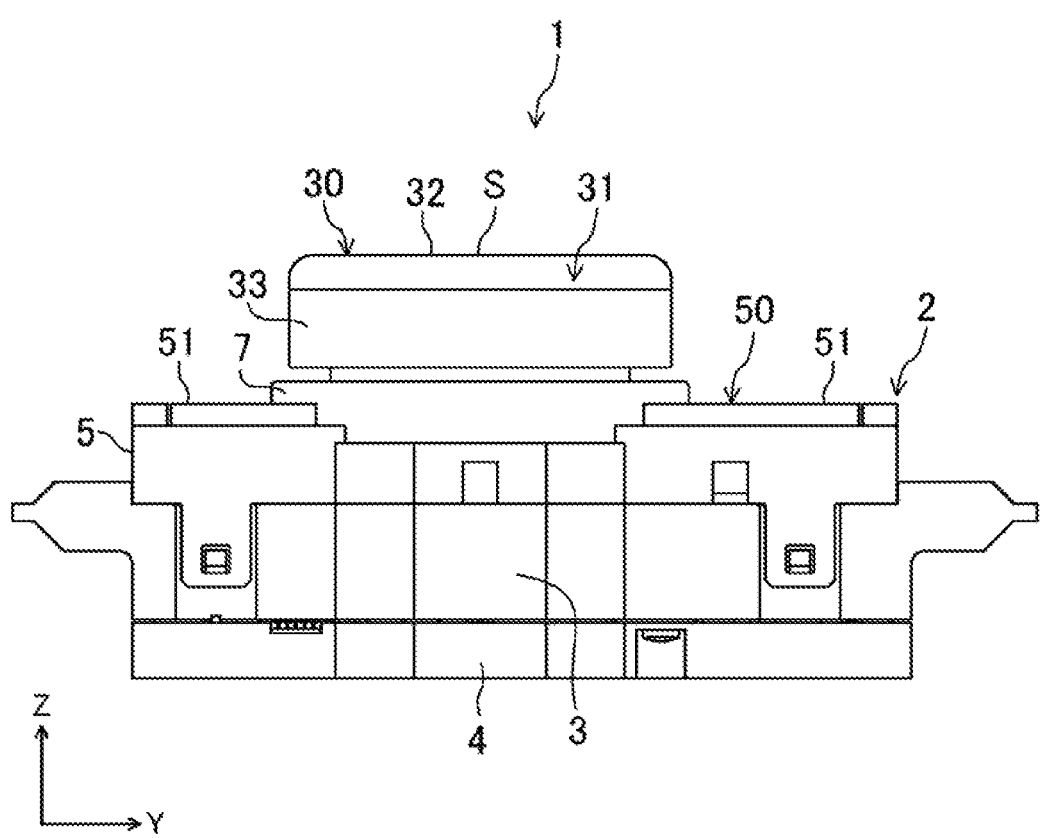
FIG. 3 is a side view illustrating the input device according to the exemplary embodiment of the present disclosure.

As illustrated in FIGS. 1 to 3, device body 2 has body cover 3, lower cover 4 that covers a lower side of body cover 3, and upper cover 5 that cover an upper side of body cover 3. Body cover 3, lower cover 4, and upper cover 5 constitute a casing of input device 1.

Figure 4:
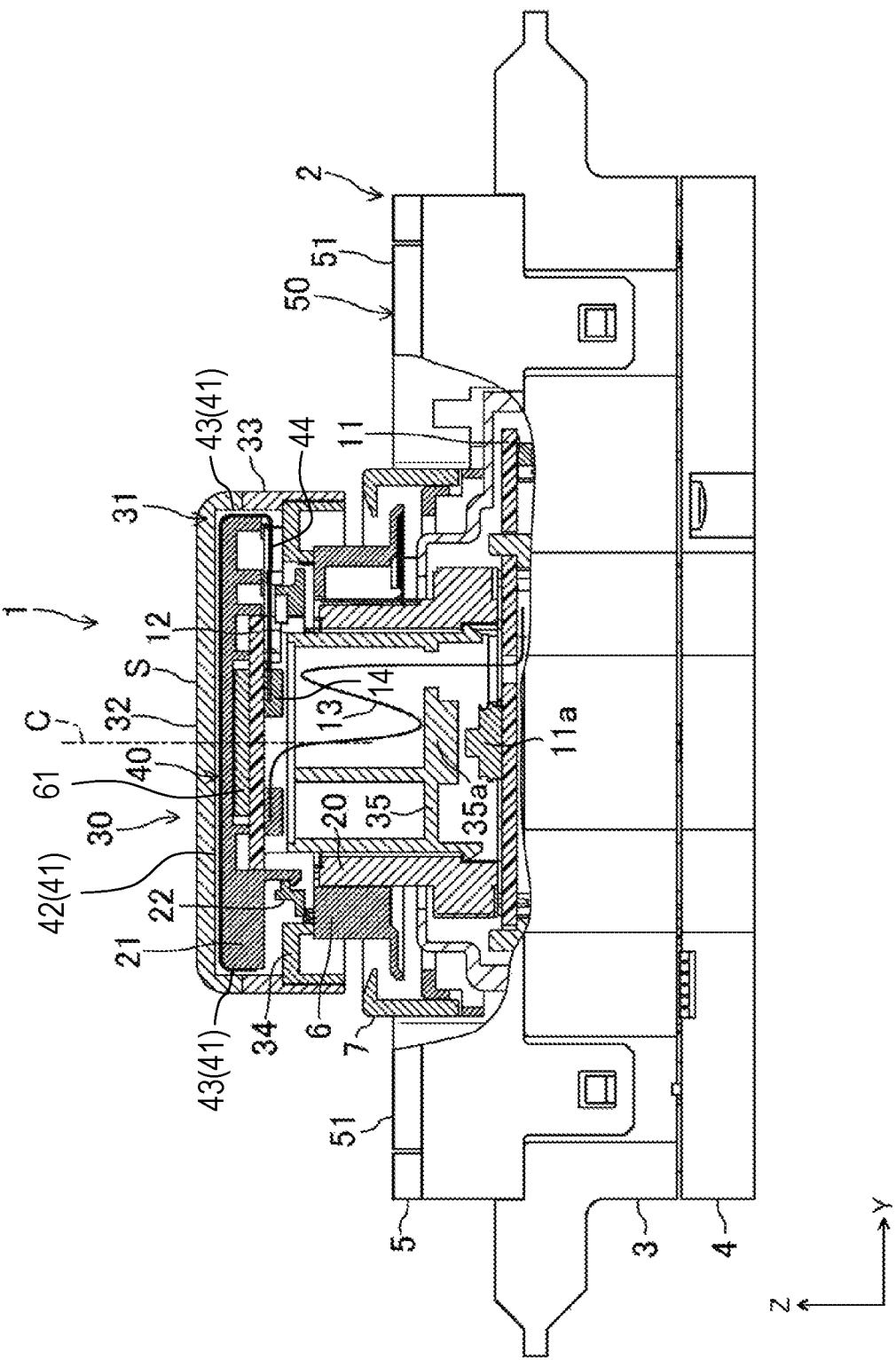
FIG. 4 is a partial sectional view illustrating a sectional structure of an upper portion of the input device taken along IV-IV line in FIG. 2.

As illustrated in FIG. 4, support part 6 having a substantially cylindrical shape protrudes from upper cover 5 in a Z direction at a substantially center in X and Y directions. Support part 6 serves to rotatably support below-mentioned operation body 31 relative to device body 2. Holder 7 having a substantially cylindrical shape is attached to upper cover 5 on an outer side of support part 6.

Device body 2 has first and second substrates 11, 12 electrically connected to a main substrate (not illustrated) provide in device body 2. Each of first and second substrates 11, 12 is substantially circular. First and second substrates 11, 12 are electrically connected to each other via flexible wiring board 13 (see FIG. 4) provided in device body 2.

First substrate 11 is mainly used to detect a position based on a below-mentioned rotating operation of operation body 31, and pressing based on a pressing operation of operation body 31, and is disposed within body cover 3. First substrate 11 is electrically connected to the main substrate not illustrated via a cable (not illustrated) provided in device body 2. Second substrate 12 is used to detect position coordinate information of the touch operation of below-mentioned sensor body 40, and is disposed above upper cover 5.

As illustrated in FIG. 4, device body 2 has inner tube 20. Inner tube 20 is provided on an upper side of first substrate 11. Inner tube 20 extends upward from an upper face of first substrate 11 to an opening of support part 6.

Seat 21 for attaching below-mentioned sensor body 40 is provided above inner tube 20. Specifically, seat 21 is substantially disc-shaped, and is disposed on an upper side of second substrate 12. Seat 21 is latched by latch 22 disposed above support part 6 of upper cover 5 to be unrotatably fixed to device body 2.

(Operation unit)

Next, as illustrated in FIGS. 1 to 4, operation unit 30 is provided above device body 2. Specifically, operation unit 30 protrudes upward from upper cover 5 of device body 2 to be movable relative to device body 2. Accordingly, an upper side of device body 2 becomes a protruding side. Hereinafter, a protruding direction of device body 2 is referred to as a vertical direction (Z direction).

Figure 5:
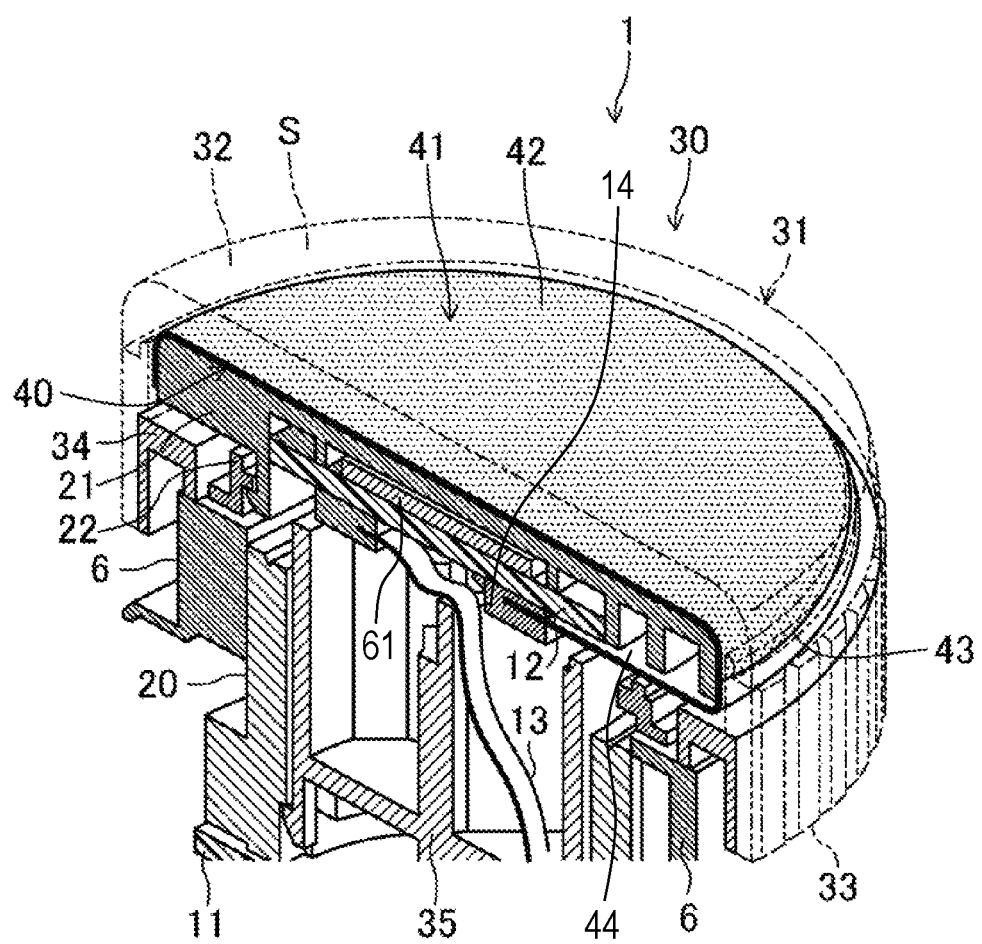
FIG. 5 is a partial enlarged perspective view illustrating a sectional structure in the vicinity of an operation unit in FIG. 4 when diagonally viewed.

Operation unit 30 has operation body 31 which has a closed-end cylindrical shape and disposed above upper cover 5. Operation body 31 has top face part 32 (first face part) and side face part 33 (second face part). Top face part 32 is substantially flat along an XY plane. As illustrated in FIG. 5, projections and depressions are continuously formed on an outer circumference of side face part 33. In FIG. 5, to highlight detection face 41 of below-mentioned sensor body 40, a portion of operation body 31 is expressed as virtual lines.

As illustrated in FIGS. 4 and 5, sliding unit 34 having a substantially cylindrical shape is provided on side face part 33 of operation body 31. An outer circumferential side of sliding unit 34 is fixedly attached to an inner circumferential face of a lower side of side face part 33. Sliding unit 34 is rotatable in a circumferential direction of support part 6 in a state where a lower end on the inner circumferential side of sliding unit 34 is in contact with an upper end of support part 6. This allows operation body 31 to rotate about rotational axis C (see alternate long and short dash line in FIG. 4) extending in the Z direction. That is, the user rotates operation unit 30 relative to device body 2 while holding side face part 33 of operation body 31, enabling a rotating operation that is different from a below-mentioned touch operation.

Operation body 31 is movable in the vertical direction relative to device body 2. Specifically, operation unit 30 has slider 35 within inner tube 20. Slider 35 is movable within inner tube 20 in the vertical direction. Pressing operation body 31 downward moves slider 35 downward. Then, pressing unit 35a formed in slider 35 presses down on switch 11a disposed on an upper face of first substrate 11. In this manner, operation body 31 enables the pressing operation that is different from the below-mentioned touch operation and the above-mentioned rotating operation.

Further, as illustrated in FIGS. 1 to 5, operation body 31 has touchable operation face S on at least top face part 32.

Specifically, as illustrated in FIGS. 4 and 5, operation unit 30 has sensor body 40 which has a film shape and provided on device body 2, in the tube of operation body 31. Sensor body 40 has a closed-end cylindrical shape, and has a bottom face (third face part) and a side face (fourth face part) extending in parallel and downward from a periphery of the bottom face. Sensor body 40 is attached to seat 21. Sensor body 40 is unrotatably fastened to seat 21 of device body 2 with a distance from operation body 31.

As illustrated in FIG. 5, sensor body 40 includes detection face 41 capable of detecting the touch operation of a detection target (for example, a finger of the user) upon contact with operation face S of operation body 31. Detection face 41 is configured as a capacitance sensor made by forming a conductive metal such as silver on at least one of a film-shaped front face and back face of sensor body 40. For example, the film constituting sensor body 40 is made of polyethylene terephthalate or polycarbonate to have a thickness of about 0.2 millimeters. Sensor body 40 is formed by shaping (forming) the film, on which the conductive metal is formed, with a mold into a closed-end cylindrical shape. For example, sensor body 40, which has a closed-end cylindrical shape, has a diameter of about 40 millimeters to 60 millimeters and a height of about 5 millimeters to 10 millimeters. In FIG. 5, to highlight detection face 41, detection face 41 is hatched with dots. As a feature of the present disclosure, a periphery of detection face 41 and a periphery of top face part 32, which has a substantially flat shape, of operation body 31 overlap each other in the Z direction (vertical direction). Specifically, the whole periphery of detection face 41 and the periphery of top face part 32 of operation body 31 overlap each other in the Z direction (vertical direction).

More specifically, detection face 41 includes bottom face detection unit 42 (first detection unit) formed on a bottom face of sensor body 40, which has a closed-end cylindrical shape, and side face detection unit 43 (second detection unit)

that is connected to bottom face detection unit 42 and is formed on a side face of sensor body 40. Bottom face detection unit 42 is opposed to a back face of top face part 32 of operation body 31 in the Z direction (vertical direction). Side face detection unit 43 is opposed to an inner circumferential face of side face part 33 of operation body 31 in a direction that is orthogonal to the Z direction (that is, a direction along the XY plane). A whole peripheral portion including the periphery of bottom face detection unit 42 (first detection unit) and side face detection unit 43 (second detection unit), and the periphery of top face part 32, which has a substantially flat shape, of operation body 31 overlap each other in the Z direction (vertical direction). A portion of the peripheral portion and the periphery of top face part 32, which has a substantially flat shape, of operation body 31 may overlap each other in the Z direction (vertical direction). Since sensor body 40 has the above-mentioned size, an effective detection area of bottom face detection unit 42 is equal to or larger than an effective detection area of side face detection unit 43. This can suppress any unnecessary touch operation on side face part 33 from being detected during the rotating operation, the relative moving operation, and the pressing operation of operation body 31. In addition, sensor body 40, which has a closed-end cylindrical shape, has a height that is smaller than a maximum width (here, a diameter of a bottom face of the cylinder). This configuration can also suppress any unnecessary touch operation on side face part 33 from being detected during the rotating operation, the relative moving operation, and the pressing operation of operation body 31.

Sensor body 40 described above has a closed-end cylindrical shape and however, is not limited to this, and may be a closed-end polygonal or a closed-end elliptical cylinder according to the shape of operation body 31. In this case, the maximum width of the tube refers to a maximum length of a diagonal line of a bottom face of the closed-end polygonal tube, or a major axis of a bottom face of a closed-end elliptical cylinder. However, especially in the configuration in which operation body 31 is rotated, operation body 31 having a cylindrical shape is easily rotated with high operability. Thus, it is desirable that sensor body 40 also has a closed-end cylindrical shape.

Sensor body 40 is configured such that detection face 41 is electrically connected to electric wire 44 in an integral manner. Specifically, a portion of the film constituting sensor body 40 oblongly extends from side face detection unit 43 of detection face 41, and the conductive metal formed on detection face 41 is continuous onto this extended portion. The extended portion on which the conductive metal is formed becomes electric wire 44. Accordingly, electric wire 44 is electrically connected to and integrated with detection face 41 to form a flat cable. Thereby, electric wire 44 for outputting a detection signal of the touch operation can be provided with simple configuration. Electric wire 44 is connected to below-mentioned touch controller 61.

Electric wire 44 is not necessarily integrated with detection face 41, and may be separated from detection face 41. In this case, for example, when a lead wire is connected to detection face 41, the number of components increases and however, degree of freedom in wiring is improved.

(Function switch)

Next, as illustrated in FIGS. 1 to 4, function switch 50 is disposed around operation unit 30. Function switch 50 enables an input operation that is different from the input operation using operation unit 30 (for example, an operation of displaying a menu or map on a screen display unit of the vehicle-mounted device not illustrated). Function switch 50 includes a plurality of (four in the figures) buttons 51. With being attached to body cover 3, each of buttons 51 is vertically movable relative to body cover 3. That is, the user presses each of buttons 51 downward to body cover 3, thereby electrically turning on an input unit provided on a main substrate not illustrated.

(Controller)

Figure 6:
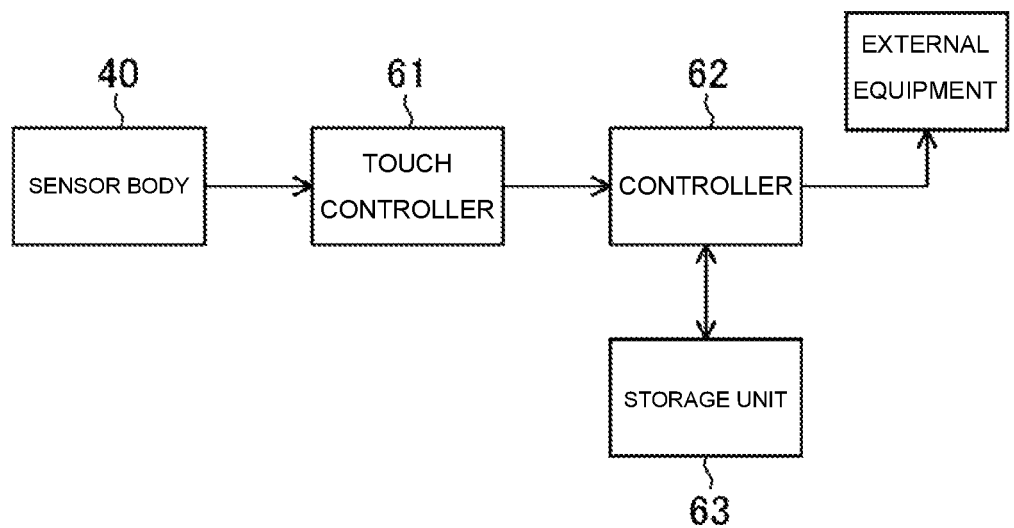
FIG. 6 is a block diagram illustrating a functional configuration of the input device.

Next, as illustrated in FIG. 6, input device 1 includes controller 62 electrically connected to each of a vehicle-mounted device (external equipment) and sensor body 40. Specifically, touch controller 61 is electrically connected to sensor body 40, and controller 62 is electrically connected to sensor body 40 via touch controller 61. Touch controller 61 is a detection circuit having a function of outputting position coordinate information obtained when detection face 41 of sensor body 40 detects the touch operation and associated information (information on the touch operation or information on a change of the touch operation, for example) to controller 62.

Touch controller 61 is configured with a one-chip integrated circuit, and is surface-mounted on second substrate 12. As illustrated in FIGS. 4 and 5, connector 14 is provided on a face located opposite to the face on which touch controller 61 of second substrate 12 is surface-mounted. Connector 14 is electrically connected to touch controller 61 via second substrate 12. Electric wire 44 is inserted into connector 14. With this configuration, touch controller 61 is electrically connected to detection face 41 of sensor body 40.

Touch controller 61 is provided within the cylinder of sensor body 40. Specifically, touch controller 61 is disposed in a closed-end cylindrical space surrounded with bottom face detection unit 42 and side face detection unit 43 of sensor body 40. This can reduce a distance of electric wire 44 between sensor body 40 and touch controller 61, suppressing wrong detection of electric wire 44 and effects of noise.

Electric wire 44 electrically connected to detection face 41 extends toward a center of top face part 32 of operation body 31. Specifically, since second substrate 12 is disposed on seat 21, which includes a center of seat 21 having a substantially disc shape, connector 14 on second substrate 12 is disposed near the center of seat 21 having a substantially disc shape. Electric wire 44 is inserted into connector 14, such that electric wire 44 extends toward the center of top face part 32 of operation body 31. In this manner, electric wire 44 can be kept away the detection target (for example, a finger of the user), reducing the possibility that electric wire 44 wrongly detects the detection target.

Input device 1 further includes storage unit 63 electrically connected to controller 62. Storage unit 63 is configured to store the position coordinate information and so on mainly outputted from touch controller 61 to controller 62. Storage unit 63 may be configured as a part of controller 62.

Controller 62 stores the position coordinate information outputted from sensor body 40 (touch controller 61) to controller 62 when sensor body 40 detects the touch operation of the detection target in contact with operation face S of operation body 31, only when the position coordinates expressed by the position coordinate information remain at the periphery of operation face S, and prohibits outputting of the position coordinate information to external equipment.

When the position coordinates continuously change from the periphery of operation face S to the inner side, controller 62 goes back to the state where the detection target is in contact with the periphery of operation face S, and outputs the position coordinate information on the touch operation from a start point to an end point to the external equipment.

A series of processing operations of controller 62 will be described below with reference to FIG. 7.

Figure 7:
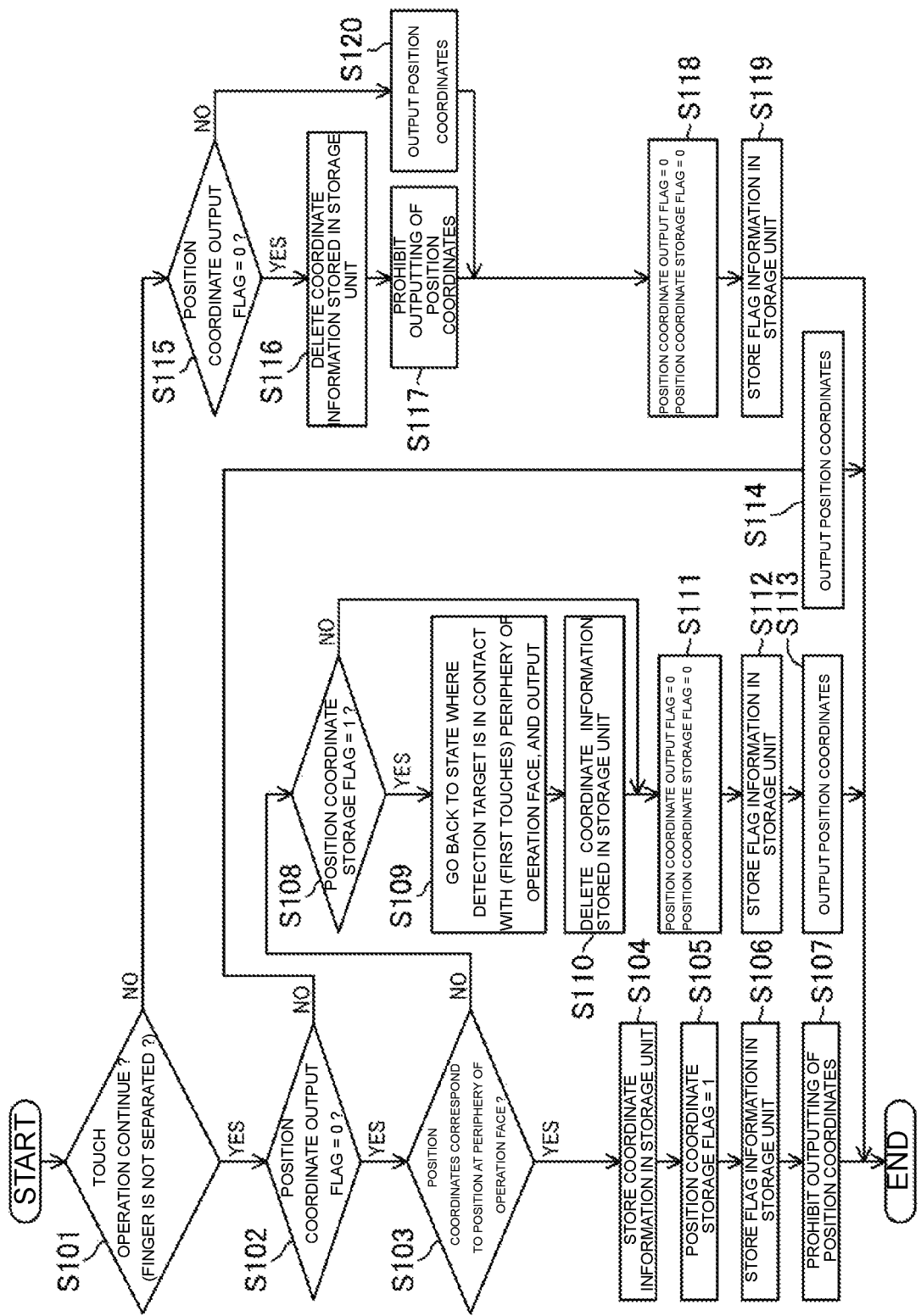
FIG. 7 is a flow chart illustrating processing operations of a controller in a touch operation.

The operations illustrated in FIG. 7 is repeated by a main routine not illustrated executed by controller 62 (that is, controller 62 captures position information of the touch operation from touch controller 61, and outputs the position information to external equipment).

In following description, a position coordinate output flag used in a series of processing operations of controller 62 determines whether controller 62 outputs the position coordinate information to the external equipment between the start point of the touch operation to the current position coordinates, and the result is stored in a memory of storage unit 63. This memory is a portion of storage unit 63. A position coordinate storage flag determines whether controller 62 stores the position coordinate information in storage unit 63, and the result is stored in a memory of storage unit 63. This memory is a portion of storage unit 63. That is, storage unit 63 stores information indicating that the position coordinate output flag or the position coordinate storage flag is turned on (for example, 1) or turned off (for example, 0). In the case of the position coordinate output flag, the position coordinate output flag is turned on when position coordinate information is outputted to the external equipment, and is turned off when the position coordinate information is not outputted and then, the position coordinate output flag is stored in storage unit 63. In the case of the position coordinate storage flag, the position coordinate storage flag is turned on when the position coordinate information is stored in storage unit 63, and is turned off when the position coordinate information is not stored in storage unit 63 and then, the position coordinate storage flag is stored in storage unit 63.

As illustrated in FIG. 7, in initial step S101, controller 62 determines whether the touch operation continues based on the information outputted from touch controller 61. When controller 62 determines that the touch operation continues based on the information outputted from touch controller 61 in step S101 (YES in step S101), the processing proceeds to step S102. In step S102, controller 62 determines whether the position coordinate output flag stored in storage unit 63 is "0". When the position coordinate output flag is "0" (YES is selected), the processing proceeds to step S103.

In step S103, controller 62 determines whether position coordinate information outputted from touch controller 61 corresponds to the periphery of operation face S of operation body 31. When controller 62 determines that the position coordinate information corresponds to the periphery of operation face S (YES is selected), the processing proceeds to step S104. In step S104, the position coordinate information and associated information is stored in storage unit 63. In step S105 following step S104, "1" is assigned to the position coordinate storage flag, and in step S106, controller 62 stores flag information indicating the position coordinate storage flag is "1" in storage unit 63. In step S107, controller 62 prohibits outputting of the position coordinate information outputted from touch controller 61 to the external equipment.

On the contrary, in step S103, when controller 62 determines that the position coordinate information does not correspond to the periphery of operation face S (NO is selected), the processing proceeds to step S108. In step S108, controller 62 determines whether position coordinate storage flag stored in storage unit 63 is "1". When the position coordinate storage flag is "1" (YES is selected), the processing proceeds to step S109. In step S109, controller 62 goes back to the state where the detection target is in contact with the periphery of operation face S, that is, the detection target first makes contact with the periphery of operation face S, and outputs position coordinate information on the touch operation from the start point to the end point, which is stored in storage unit 63, to external equipment. In step S110 following step S109, position coordinate information and associated information stored in storage unit 63 is deleted, and the processing proceeds to step S111. In step S111 following step S110, "0" is assigned to the position coordinate output flag, and "0" is assigned to position coordinate storage flag, and in step S112, controller 62 stores information indicating that the position coordinate output flag is "0" and the position coordinate storage flag is "0" in storage unit 63. In step S113, controller 62 outputs the position coordinate information outputted from touch controller 61 to the external equipment.

On the contrary, when the position coordinate storage flag is "0" (NO is selected) in step S108, the processing proceeds to step S111, and the processing in step S111 is executed as described above.

On the contrary, when the position coordinate output flag stored in storage unit 63 is "1" (NO is selected) in step S102, the processing proceeds to step S114. In step S114, controller 62 outputs the position coordinate information outputted from touch controller 61 to the external equipment.

On the contrary, when controller 62 determines that the touch operation does not continue (the touch operation is finished) based on the information outputted from touch controller 61 in step S101, the processing proceeds to step S115, and controller 62 determines whether the position coordinate output flag stored in storage unit 63 is "0". When the position coordinate output flag is "0" (YES is selected), the processing proceeds to step S116. In step S116, position coordinate information and associated information stored in storage unit 63 is deleted. In step S117, controller 62 prohibits outputting of the position coordinate information outputted from touch controller 61 to the external equipment, and the processing proceeds to step S118. In step S118 following step S117, "0" is assigned to the position coordinate output flag, and "0" is assigned to the position coordinate storage flag, and in step S119, controller 62 stores information indicating that the position coordinate output flag is "0", and the position coordinate storage flag is "0" in storage unit 63.

On the contrary, when the position coordinate output flag stored in storage unit 63 is "1" (NO is selected) in step S115, the processing proceeds to step S120. In step S120, controller 62 outputs the position coordinate information outputted from touch controller 61 to the external equipment. Following step S120, the processing proceeds to step S118, and the processing in step S118 is executed as described above.

In this manner, controller 62 completes the series of operations.

(Functions and effects of exemplary embodiment)

As has been described, input device 1 according to the exemplary embodiment of the present disclosure, since the periphery of detection face 41 of sensor body 40 and the periphery of top face part 32 of operation body 31 overlap each other in the vertical direction, the periphery of top face part 32 of operation body 31 is included in touchable operation face S. That is, the area of operation face S extends up to the vicinity of side face part 33 of operation body 31. Thus, the touch operation of the user at the periphery of top face part 32 of operation body 31 can be properly detected at the periphery of detection face 41, which corresponds to the periphery of top face part 32. Accordingly, input device 1 can improve the touch operation onto operation body 31.

Since the whole periphery of detection face 41 and the periphery of top face part 32 of operation body 31 overlap each other in the vertical direction, the whole periphery of top face part 32 is included in touchable operation face S. Accordingly, the touch operation on any suitable position in the periphery of top face part 32 is possible, further improving the touch operation onto operation body 31.

Detection face 41 is configured such that bottom face detection unit 42 is opposed to top face part 32 of operation body 31 in the vertical direction, and side face detection unit 43 is opposed to side face part 33 of operation body 31 in a direction that is orthogonal to the vertical direction. Accordingly, operation face S can be extended from the periphery of top face part 32 of operation body 31 to corners of top face part 32 and side face part 33, further improving the operability of the touch operation.

Operation body 31 is attached to device body 2 with a distance from sensor body 40. Operation body 31 is rotatable relative to device body 2 about a rotational axis extending in the vertical direction, and sensor body 40 is unrotatably fixed to device body 2. Thus, even when operation body 31 is rotated relative to device body 2 by the rotating operation, the position of sensor body 40 relative to device body 2 does not change. For this reason, irrespective of the position of rotated operation body 31, the user can stably perform the touch operation onto operation face S of operation body 31. Sensor body 40 is unrotatably fixed to device body 2 to simplify electric wiring of sensor body 40 in device body 2.

Function switch 50 is provided around operation unit 30 in device body 2. A function of an input operation that is different from the input operation of operation unit 30 can be imparted to function switch 50 to diversify the input operations of input device 1.

For example, when the user rotates operation body 31 relative to device body 2 while holding side face part 33 of operation body 31 with his/her fingers, the fingers may unexpectedly touch the periphery of top face part 32 of operation body 31. At this time, detection face 41 of sensor body 40 detects the touch operation at the periphery of top face part 32 of operation body 31. That is, in input device 1, since the periphery of top face part 32 of operation body 31 is included in operation face S, irrespective of the user's intention, the user's finger may unexpectedly touch the periphery of top face part 32 of operation body 31, for example, during the rotating operation, leading to a wrong operation. The input operation of operation body 31 is not limited to rotating operation, and includes operations other than the rotating operation (for example, the above-mentioned pressing operation).

Thus, in input device 1 according to the exemplary embodiment of the present disclosure, when sensor body 40 detects the touch operation of the detection target in contact with operation face S, controller 62 prohibits outputting of position coordinate information outputted from sensor body 40 to controller 62, to external equipment, only when the position coordinates expressed by position coordinate information remain at the periphery of operation face S. That is, for example, even when the user's finger unexpectedly makes contact with the periphery of top face part 32 of operation body 31 during the rotating operation, controller 62 determines that the user does not intend to perform the touch operation and thus, does not output the position coordinate information to the external equipment. In this manner, input device 1 can properly prevent any wrong operation other than the touch operation.

Further, when the position coordinates continuously change from the periphery of operation face S to the inner side, controller 62 goes back to the state where the detection target is in contact with the periphery of operation face S, and outputs the position coordinate information on the touch operation from a start point to an end point to the external equipment. That is, when the user's finger continuously moves inward from the periphery of operation face S by the touch operation, controller 62 determines that the user intends to perform the touch operation, and outputs position coordinate information on the touch operation from the start point to the end point to the external equipment. In this manner, input device 1 can ensure excellent operability while preventing any wrong operation.

[Other exemplary embodiments]

In input device 1 according to the exemplary embodiment, operation body 31 can be rotated and pressed. However, the present disclosure is not limited to this. For example, operation body 31 may be rotated and pressed, as well as be moved relative to device body 2 in a direction that is orthogonal to the vertical direction (that is, the direction along the XY plane that is orthogonal to the Z direction).

In input device 1 according to the exemplary embodiment, the whole periphery of detection face 41 and the periphery of top face part 32 of operation body 31 overlap each other in the vertical direction. However, the present disclosure is not limited to this. That is, a portion of the periphery of detection face 41 and the periphery of top face part 32 of operation body 31 may overlap each other in the vertical direction. In such mode, as in the exemplary embodiment, the touch operation onto operation body 31 can be improved.

Although the exemplary embodiments of the present disclosure have been described above, the present disclosure is not limited to the above-described exemplary embodiments and various changes can be made within a scope of the present disclosure.

INDUSTRIAL APPLICABILITY

For example, the present disclosure is industrially applicable to a vehicle-mounted input device provided on a center console in an automobile.

What is claimed is:

1. An input device comprising:
a device body;
an operation unit; and
a controller, wherein
the operation unit has an operation body and a sensor body, the operation body and the sensor body being disposed in a first direction of the device body,
the operation body is movable relative to the device body in the first direction of the device body, and has a first face part and a second face part,
a second direction is opposite to the first direction,
the first face part has a substantially flat face perpendicular to the first direction, and the second face part has a face extending from a periphery of the first face part in parallel to the second direction,
the sensor body is disposed on the device body within the operation body,
the operation body is configured to allow a touch operation through an operation face formed on at least the first face part and to allow an input operation different from the touch operation when the operation body moves relative to the device body while being held at the second face part, the sensor body includes a detection face having a substantially flat shape detecting the touch operation of a detection target in contact with the operation face, a portion of a periphery of the detection face and the periphery of the first face part of the operation body overlap each other in the first direction of the device body, the controller is electrically connected to each of external equipment and the sensor body, when the sensor body detects continuous movement of the detection target between the periphery and the flat face of the first face part of the operation face, the controller determines that the touch operation is initiated, and when the sensor body detects that the detection target remains at the periphery of the operation face, the controller determines that the input operation, different than the touch operation, is initiated.

2. The input device according to claim 1, wherein a whole periphery of the detection face and the periphery of the first face part of the operation body overlap each other in the first direction.

3. The input device according to claim 1, wherein the sensor body has a third face part and a fourth face part, the third face part has a substantially flat face perpendicular to the first direction, and the fourth face part has a face extending from a periphery of the third face part in parallel to the second direction, the detection face includes:

a first detection unit on the third face part of the sensor body in the first direction; and a second detection unit connected to the first detection unit, and disposed on the fourth face part of the sensor body, and the detection face is configured such that the first detection unit is opposed to the first face part of the operation body in the first direction, and the second detection unit is opposed to the second face part of the operation body in a third direction that is orthogonal to the first direction.

4. The input device according to claim 1, wherein the operation body is attached to the device body with a distance from the sensor body.

5. The input device according to claim 1, wherein the operation body is rotatable relative to the device body about a rotational axis extending in the first direction, and the sensor body is unrotatably fixed to the device body.

6. The input device according to claim 1, wherein in the device body, a function switch is disposed around the operation unit.

7. The input device according to claim 1, wherein when the sensor body detects the touch operation of the detection target in contact with the operation face, the sensor body outputs position coordinates of the operation face in contact with the detection target, as position coordinate information, to the controller to carry out the touch operation, and when the position coordinates expressed by the position coordinate information remain at the periphery of the operation face, the controller prohibits outputting of the position coordinate information to the external equipment to prevent an unintended touch operation.

8. The input device according to claim 7, wherein when the position coordinates expressed by the position coordinate information continuously change from the periphery of the operation face to an inner side, the controller goes back to a state where the detection target is in contact with the periphery of the operation face, and outputs the position coordinate information on the touch operation from a start point to an end point to the external equipment.

9. The input device according to claim 1, wherein the first face part of the operation body in the first direction is polygonal.

10. The input device according to claim 1, wherein the first face part of the operation body in the first direction is circular.

11. The input device according to claim 1, wherein the periphery of the detection face is opposed to the periphery of the first face part.

12. The input device according to claim 3, wherein an effective detection area of the first detection unit is larger than an effective detection area of the second detection unit.

13. The input device according to claim 3, wherein a height of the sensor body in the first direction is smaller than a maximum width of the sensor body in a direction perpendicular to the first direction.

14. The input device according to claim 3, wherein the third face part of the sensor body in the first direction is polygonal.

15. The input device according to claim 3, wherein the third face part of the sensor body in the first direction is circular.

16. The input device according to claim 3, wherein a detection circuit of the sensor body is disposed within the sensor body.

17. The input device according to claim 1, further comprising the sensor body is configured such that the detection face is electrically connected to an electric wire in an integral manner.

18. The input device according to claim 1, further comprising an electric wire electrically connected to the detection face extends toward a center of the first face part of the operation body.

19. The input device according to claim 18, wherein the sensor body is a molded film including conductive metal, the conductive metal is provided integrally in the detection face, the detection face of the sensor body includes a bottom face detection sensor and a side face detection sensor, and the conductive metal of the side face detection sensor extends integrally into the electric wire such that the detection face and the electric wire define a flat cable.

20. The input device according to claim 19, wherein the controller is disposed in a closed-in space surrounded by the bottom face detection sensor and the side face detection sensor, and the electric wire extends toward the controller in the first direction from the periphery of the detection face to a center of first face part of the operation body.

* * * * *